US006230563B1

(12) United States Patent
Clark et al.

(10) Patent No.: US 6,230,563 B1
(45) Date of Patent: May 15, 2001

(54) DUAL-MASS VIBRATORY RATE GYROSCOPE WITH SUPPRESSED TRANSLATIONAL ACCELERATION RESPONSE AND QUADRATURE-ERROR CORRECTION CAPABILITY

(75) Inventors: William A. Clark, Fremont; Thor N. Juneau; Mark A. Lemkin, both of Berkeley; Allen W. Roessig, Albany, all of CA (US)

(73) Assignee: Integrated Micro Instruments, Inc., Berkeley, CA (US)

( * ) Notice: Subject to any disclaimer, the term of this patent is extended or adjusted under 35 U.S.C. 154(b) by 0 days.

(21) Appl. No.: 09/321,972

(22) Filed: May 28, 1999

Related U.S. Application Data

(60) Provisional application No. 60/088,681, filed on Jun. 9, 1998, and provisional application No. 60/091,346, filed on Jul. 1, 1998.
(51) Int. Cl.[7] ........................................................ G01P 9/04
(52) U.S. Cl. .................................... 73/504.04; 73/504.12
(58) Field of Search ............................ 73/504.04, 504.02, 73/504.03, 514.29, 514.37, 514.38, 514.32, 862.59, 504.12, 504.14, 504.15

(56) References Cited

U.S. PATENT DOCUMENTS

| Re. 32,931 | 5/1989 | Staudte . |
|---|---|---|
| Re. 33,479 | 12/1990 | Juptner et al. . |
| 4,061,043 | 12/1977 | Stiles . |

(List continued on next page.)

OTHER PUBLICATIONS

Clark, W.A., Howe, R.T., Horowitz, R., "Surface Micromachined Z–axis Vibratory Rate Gyroscope," *IEEE Solid–State Sensor and Actuator Workshop*, Hilton Head Island, SC, pp. 283–287, Jun. 1996.

Juneau, T., Pisano, A.P., "Micromachined Dual Input Axis Angular Rate Sensor," *IEEE Solid–State Sensor and Actuator Workshop*, Hilton Head Island, SC, pp. 299–302, Jun. 1996.

Clark, W.A., Micromachined Vibratory Rate Gyroscopes, Doctoral Dissertation, University of California, 1997.

Juneau, T.N., Micromachined Dual Input Axis Rate Gyroscope, Doctoral Dissertation, University of California, 1997.

Geen, J.A., "A Path to Low Cost Gyroscopy," *IEEE Solid–State Sensor and Actuator Workshop*, Hilton Head Island, SC, pp. 51–54, Jun. 1998.

*Primary Examiner*—Helen Kwok
(74) *Attorney, Agent, or Firm*—Fliesler, Dubb, Meyer & Lovejoy LLP

(57) ABSTRACT

A microfabricated vibratory rate gyroscope to measure rotation includes two proof-masses mounted in a suspension system anchored to a substrate. The suspension has two principal modes of compliance, one of which is driven into oscillation. The driven oscillation combined with rotation of the substrate about an axis perpendicular to the substrate results in Coriolis acceleration along the other mode of compliance, the sense-mode. The sense-mode is designed to respond to Coriolis acceleration while suppressing the response to translational acceleration. This is accomplished using one or more rigid levers connecting the two proof-masses. The lever allows the proof-masses to move in opposite directions in response to Coriolis acceleration. The invention includes a means for canceling errors, termed quadrature error, due to imperfections in implementation of the sensor. Quadrature-error cancellation utilizes electrostatic forces to cancel out undesired sense-axis motion in phase with drive-mode position.

22 Claims, 14 Drawing Sheets

U.S. PATENT DOCUMENTS

| | | |
|---|---|---|
| 5,016,072 | 5/1991 | Greiff . |
| 5,025,346 | 6/1991 | Tang et al. . |
| 5,203,208 | 4/1993 | Bernstein . |
| 5,349,855 | 9/1994 | Bernstein et al. . |
| 5,383,362 | 1/1995 | Putty et al. . |
| 5,392,650 | 2/1995 | O'Brien et al. . |
| 5,450,751 | 9/1995 | Putty et al. . |
| 5,488,863 | 2/1996 | Mochida et al. . |
| 5,505,084 | 4/1996 | Greiff et al. . |
| 5,511,420 | 4/1996 | Zhao et al. . |
| 5,563,343 | 10/1996 | Shaw et al. . |
| 5,565,625 | 10/1996 | Howe et al. . |
| 5,597,955 | 1/1997 | Leger et al. . |
| 5,635,638 | 6/1997 | Geen . |
| 5,635,639 | 6/1997 | Greiff et al. . |
| 5,635,640 | 6/1997 | Geen . |
| 5,635,739 | 6/1997 | Grieff et al. . |
| 5,656,777 | 8/1997 | Petri et al. . |
| 5,696,420 | 12/1997 | Inanaga et al. . |
| 5,698,784 | 12/1997 | Hotelling et al. . |
| 5,739,410 | 4/1998 | Fell . |
| 5,747,690 | 5/1998 | Park et al. . |
| 5,747,961 | 5/1998 | Ward et al. . |
| 5,753,817 | 5/1998 | Park et al. . |
| 5,757,103 | 5/1998 | Lee et al. . |
| 5,767,405 | 6/1998 | Bernstein et al. . |
| 5,780,739 | 7/1998 | Kang et al. . |
| 5,780,740 | 7/1998 | Lee et al. . |
| 5,783,749 | 7/1998 | Lee et al. . |
| 5,783,897 | 7/1998 | Okaguchi . |
| 5,783,973 | 7/1998 | Weinberg et al. . |
| 5,869,760 | 2/1999 | Geen . |
| 5,895,850 | 4/1999 | Buestgens . |
| 5,908,986 | 6/1999 | Mitamura . |
| 5,911,156 | 6/1999 | Ward et al. . |
| 5,920,012 * | 7/1999 | Pinson ............................... 73/514.32 |

* cited by examiner

DUAL-MASS VIBRATORY RATE GYROSCOPE WITH SUPPRESSED TRANSLATIONAL ACCELERATION RESPONSE AND QUADRATURE-ERROR CORRECTION CAPABILITY

PRIOR APPLICATION DATA

This application claims the benefit of U.S. Provisional Application No. 60/088,681 filed Jun. 9, 1998, and No. 60/091,346 filed Jul. 1, 1998.

IDENTIFICATION OF GOVERNMENT INTEREST

This invention was made with Government support under NAS5-97227 awarded by the National Aeronautics and Space Administration (NASA). The Government has certain rights in the invention.

FIELD OF THE INVENTION

This invention relates generally to gyroscopes and more particularly, to vibratory rate gyroscopes utilizing two proof-masses to measure rotation rate.

BACKGROUND OF THE INVENTION

Rate gyroscopes are sensors that measure rotation rate. Rate gyroscopes have uses in many commercial and military applications including, but not limited to, inertial navigation, vehicular skid control, and platform stabilization.

A vibratory rate gyroscope is a sensor that responds to a rotation rate by generating and measuring Coriolis acceleration. Coriolis acceleration is generated by any object (such as a proof-mass) that has some velocity relative to a rotating reference frame. In vibratory rate gyroscopes, one or more proof-masses are suspended from flexures and made to oscillate thus providing a velocity necessary to generate Coriolis acceleration. Measurement of the resulting Coriolis acceleration can then yield an estimate of the rotation rate of the sensor.

An idealized version of such a sensor is shown in FIG. 1. In this figure a three-dimensional, mutually orthogonal coordinate system is shown for reference. The axes are arbitrarily labeled "X", "Y" and "Z", to enable description of background material as well as the invention. The axis of oscillation, which is largely coincident with the X-axis, is often referred to as the drive-mode. Coriolis acceleration is generated perpendicular to the drive-mode along the sense-mode, which lies largely along the Y-axis. The Coriolis acceleration generated by the system shown in FIG. 1 is given by:

$$a_{Coriolis} = 2\Omega_z D_x \omega_x \cos(\omega_x t) \quad \text{Equation 1}$$

where $a_{Coriolis}$ is the Coriolis acceleration generated along the sense-mode, $\Omega_z$ is the rotation rate to be measured about the Z-axis, and $\omega_x$ and $D_x$ are the frequency and magnitude of drive-mode oscillation respectively. The Coriolis acceleration causes an oscillatory displacement of the sensor along the sense-mode with magnitude proportional to the generated Coriolis acceleration. Ideally, the drive-mode is coincident with the forcing means used to sustain oscillation (located along the X-axis or drive-axis), and the sense-mode is coincident with the sensing means used to detect displacements due to Coriolis acceleration (located along the Y-axis or sense-axis). The design and fabrication of the proof-mass and the suspension will dictate the actual orientation of the drive- and sense-modes with respect to the driving and sensing axes, however. An important fact to note is that the Coriolis acceleration signal along the sense-axis is in phase with velocity of the drive-mode, which is 90 degrees out-of-phase with proof-mass displacement along the drive-mode. While the Coriolis acceleration is 90 degrees out-of-phase with the proof-mass displacement along the drive-mode, displacements along the sense-mode due to Coriolis acceleration may have a different phase relationship to the proof-mass displacement along the drive-mode depending on several factors including: the relative values of drive-mode oscillation frequency to sense-mode resonant frequency, and the quality factor of the sense-mode.

To accurately measure rotation rate, the Coriolis acceleration must be easily distinguished from other sources of acceleration. Coriolis acceleration is unique for three reasons: 1) it occurs along the sense-mode which lies largely along the Y-axis, 2) it occurs at the driven-mode oscillation frequency, $\omega_x$, and 3) it is in phase with the velocity of the drive-mode oscillation. Further discrimination of Coriolis acceleration can be achieved using dual-mass gyroscopes that generate a differential Coriolis acceleration in response to a rate input. Note that Coriolis acceleration can be difficult to measure in the presence of quadrature error. Quadrature error results in an oscillatory acceleration having three properties (two of which are shared with Coriolis acceleration): 1) it occurs along the Y-axis, 2) it occurs at the driven-mode oscillation frequency, $\omega_x$, and 3) it is either in phase or 180-degrees out of phase with the position (not velocity) of the drive-mode oscillation, depending on the sign of the error. For a comprehensive discussion of quadrature error, please see Clark, W. A., *Micromachined Vibratory Rate Gyroscopes,* Doctoral Dissertation, University of California, 1997. Thus, Coriolis acceleration and quadrature error are distinguished only by their phase relative to the driven-mode oscillation.

Forces may be applied to the gyroscope using variable air-gap capacitors formed between one or more plates (or conductive nodes) attached to the proof-mass and one or more plates (or conductive nodes) attached to the substrate. Note that electrostatic forces result between charged capacitor plates. The magnitude and direction of the force is given by the gradient of the potential energy function for the capacitor as shown below.

$$\vec{F} = -\nabla U = -\nabla \left[\frac{Q^2}{2C(x, y, z)}\right] \quad \text{Equation 2}$$

As an example, an appropriate oscillation in the gyroscope may be generated using a force along a single axis (e.g. the X-axis). Equation 2 implies that any capacitor that varies with displacement along the X-axis will generate an appropriate force. An implementation of a pair of such capacitors is shown in FIG. 2. This capacitor configuration has a number of advantages including ample room for large displacements along the X-axis without collisions between comb fingers. By applying differential voltages with a common mode bias $V_{DC}$ across electrically conductive comb fingers 72, 73a and 72, 73b a force that is independent of X-axis displacement and linear with control voltage, $v_x$ is created:

$$V_1 = V_{DC} - v_x \quad \text{Equation 3}$$
$$V_2 = V_{DC} + v_x$$

-continued $$F_x = \frac{1}{2}\frac{\partial C}{\partial x}V_2^2 - \frac{1}{2}\frac{\partial C}{\partial x}V_1^2 = 2\frac{C_0}{X_0}V_{DC}v_x$$

where $C_0$ and $X_0$ are the capacitance and X-axis air-gap at zero displacement respectively. An equivalent method of applying forces chooses $V_1$, $V_2$ such that:

$$V_1 = V_{DC} - v_x, V_2 = -V_{DC} - v_x \qquad \text{Equation 4}$$

Note that in both of these cases the magnitude of the force is proportional to the control voltage, $v_x$, and the DC bias voltage, $V_{DC}$. This permits the magnitude and direction of the force to be directly controlled by varying either $v_x$ or $V_{DC}$ while maintaining the other voltage constant.

Many methods are known that sense motion or displacement using air-gap capacitors. Details of capacitive measurement techniques are well known by those skilled in the art. These methods may be used for detection of displacement due to Coriolis acceleration, measuring quadrature error, or as part of an oscillation-sustaining loop. Often a changing voltage is applied to two nominally equal-sized capacitors, formed by a plurality of conductive fingers, with values that change in opposite directions in response to a displacement. One method applies voltages to these sensing capacitors in a manner that generates a charge that is measured by a sense interface. (See for example: Boser, B. E., Owe, R. T., "Surface Micromachined Accelerometers," IEEE Journal of Solid-State Circuits, vol.31, pp. 366–75, March 1996., or Lemkin, M., Boser B. E., "A Micromachined Fully Differential Lateral Accelerometer," CICC Dig. Tech. Papers, May 1996, pp. 315–318.) Another method uses a constant DC bias voltage applied across two sensing capacitors. Any change in the capacitance values results in current flow that is detected by a sense interface. (See for example Nguyen, C. T.-C., Howe, R. T., "An Integrated CMOS Micromechanical Resonator High-Q Oscillator," IEEE JSSC, pp. 440–455, April 1999.) Furthermore, some methods of capacitive detection use time-multiplexing (see for example: M. Lemkin, B. E. Boser, "A Three-axis Micromachined Accelerometer With a CMOS Position-Sense Interface and Digital Offset-trim Electronics," IEEE Journal of Solid-State Circuits, pp. 456–68, April 1999) or frequency multiplexing (see for example Sherman, S. J, et. al., "A Low Cost Monolithic Accelerometer; Product/technology Update," International Electron Devices Meeting, San Francisco, Calif., December 1992, pp. 501–4) to enable electrostatic forces to be applied to a microstructure and displacement or motion of the microstructure to be sensed using a single set of capacitors. An example of an application in which time- or frequency-multiplexing of capacitor function in such a manner may prove useful includes a force-feedback loop.

Provided with a controllable force applied to a structure and a measure of the structure's deflection, the structure may be driven into oscillation using feedback. The desired oscillation is achieved by measuring the structure's displacement or velocity then determining the magnitude, and/or phase of the force or forces to apply to the structure. The measurement of the structure's displacement and the force(s) applied may be electrostatic as described above. In a dual-mass gyroscope the position or velocity detected by the sense interface often reflects relative motion between the two masses, and the forces applied to the two masses may contain a differential force component. Many methods are known to sustain drive-mode oscillation.

Because of imperfections introduced in the manufacturing process, the gyroscope driven-mode and sense-axis may not be perfectly orthogonal, thereby causing quadrature error. Imperfections in elements of the suspension are one possible cause of this non-orthogonality. Phase lag in detection circuitry can lead to quadrature error leakage into the sensor output. Results of this leakage may include large sensor output offsets, output-offset drift, and noise. In addition, large quadrature-error signals may cause saturation of sense-mode interfaces.

SUMMARY OF THE INVENTION

In one aspect, the invention comprises a dual-mass vibratory microstructure, such as a gyroscope, with improved suspension. The microstructure comprises a substrate, two proof-masses, and a suspension system. The suspension connects the two proof-masses to the substrate. In addition, the suspension allows for two modes of compliance: the driven and sensing modes. The suspension may include a plurality of compliant beams and may include at least one rigid beam that serves as a lever connecting the two proof-masses.

A further aspect of the invention includes a microstructure and circuitry for canceling errors, termed quadrature error. An example of one source of quadrature error is imperfections in the manufacturing process. Quadrature-error cancellation utilizes electrostatic forces to cancel undesired sense-axis motion either substantially close to in-phase or 180 degrees out-of-phase with drive-mode displacement. A nullifying electrostatic force may be applied in-phase with drive-mode position through a differential bias applied to one or more sets of variable capacitors. Quadrature-error cancellation may be operated open-loop, in which case the differential bias is constant. Alternatively, quadrature-error cancellation may be operated closed-loop, in which case quadrature-error is continuously or periodically measured. The resulting measurement of quadrature error may be used to adjust the differential bias to cancel the error signal.

BRIEF DESCRIPTION OF THE DRAWINGS

For a better understanding of the nature and objects of the invention, reference should be made to the following detailed description taken in conjunction with the accompanying drawings, in which.

Like reference numerals refer to corresponding parts throughout all the views of the drawings.

DETAILED DESCRIPTION OF THE INVENTION

Figure 1:
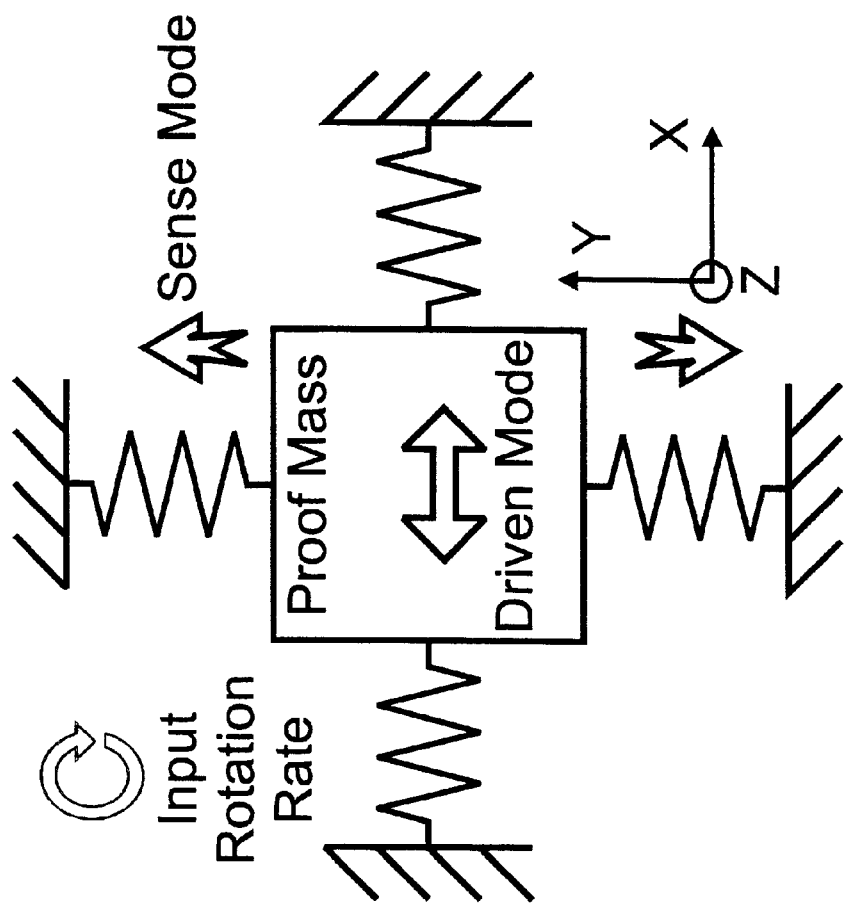
FIG. 1 is a conceptual representation of a vibratory rate gyroscope illustrating driven-mode oscillation and sense-mode response.
Figure 2:
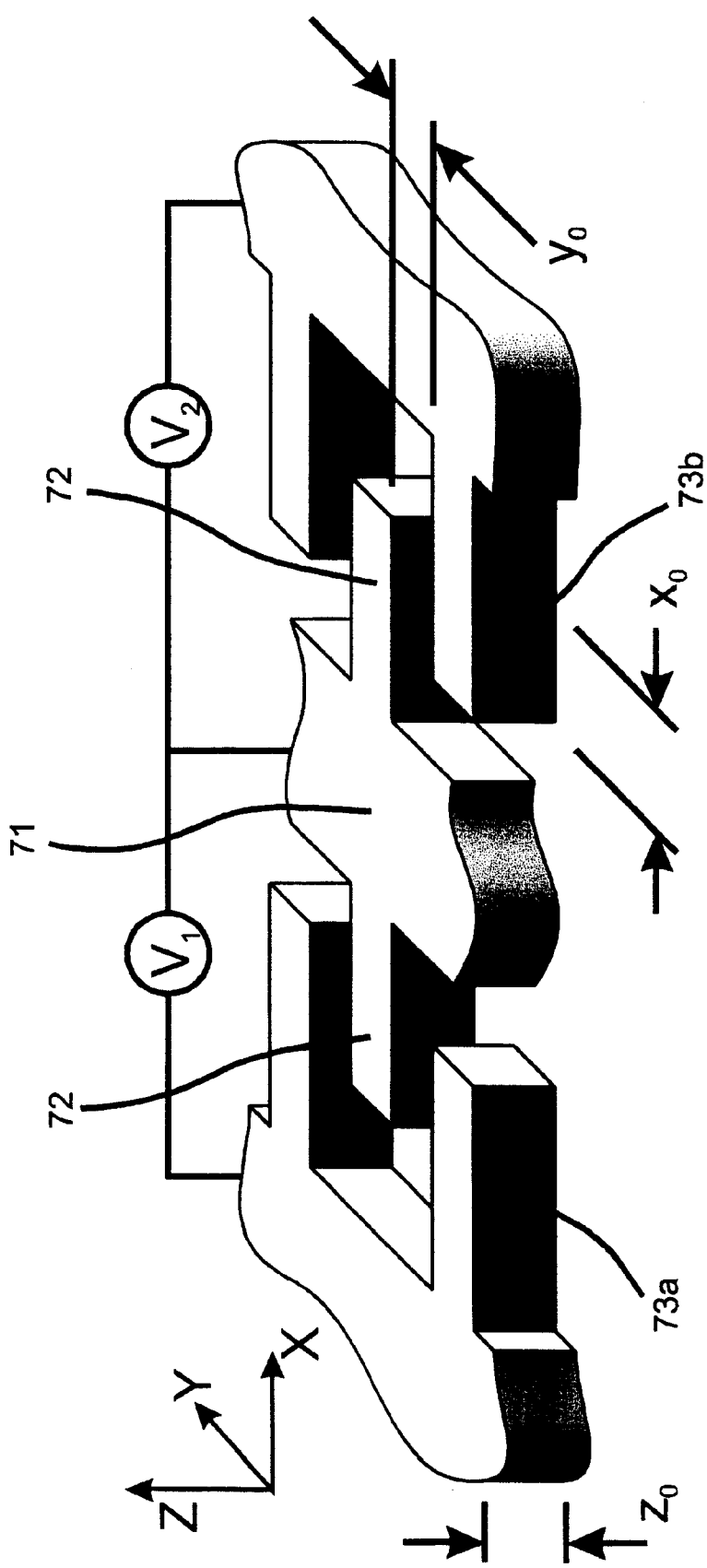
FIG. 2 is a perspective view of a set of interdigitated comb-fingers suitable for sustaining proof-mass oscillation along the drive-mode.
Figure 3:
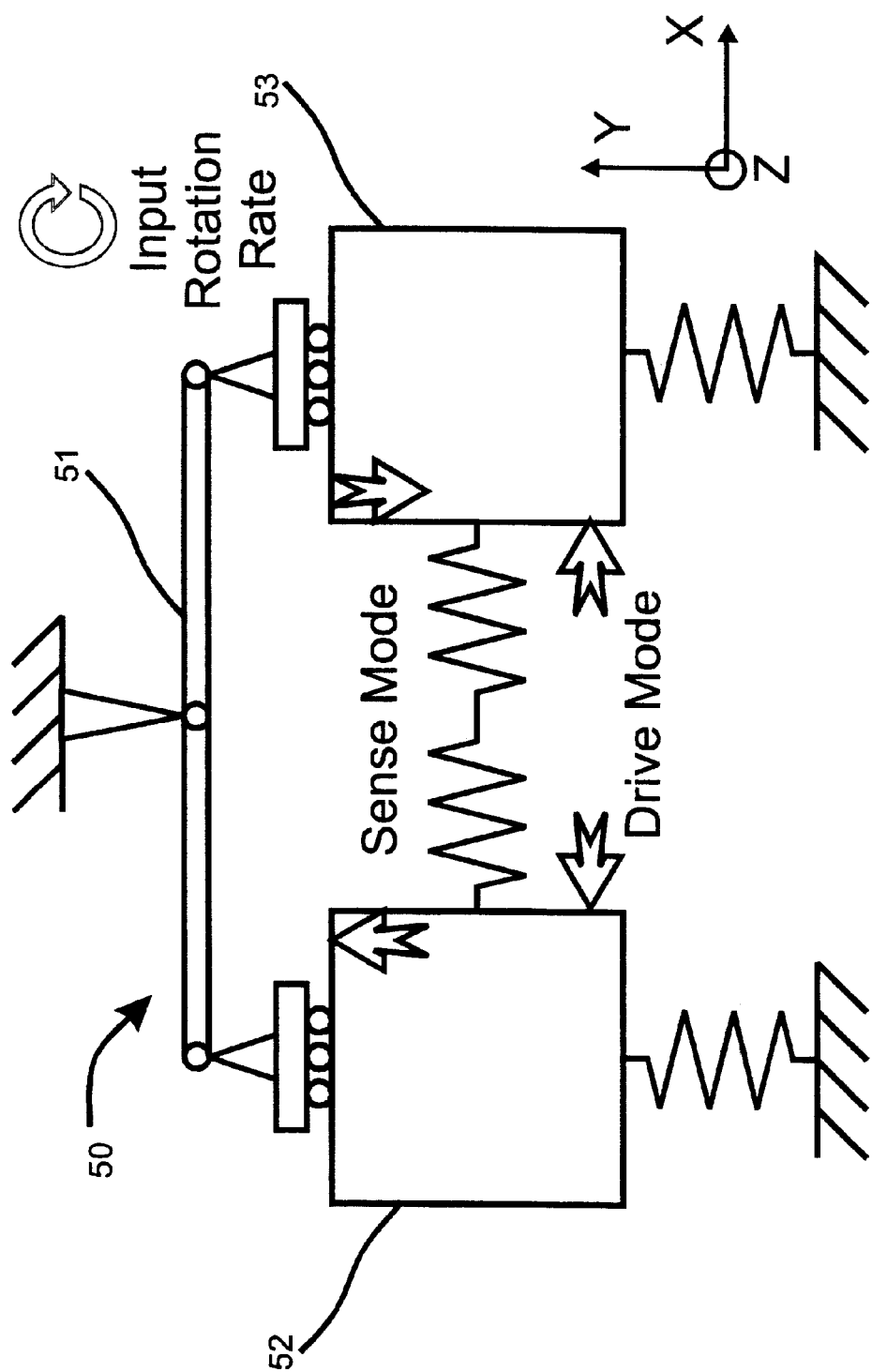
FIG. 3 is a conceptual representation of a gyroscopic dual-mass mechanical sense-element that suppresses deflections resulting from translational accelerations along the sense-axis.

A dual-mass gyroscope with an improved suspension system is conceptually illustrated in FIG. 3. The suspension system holds the proof-masses and allows for two modes of compliance. One mode of compliance is in the drive mode. This mode of compliance is driven into oscillation thereby supplying the velocity necessary to generate Coriolis acceleration. Note the drive-mode motions of the proof-masses are 180 degrees out of phase with respect to each other, as represented by the arrows in FIG. 3. Another mode of compliance is the sense-mode, which may be excited by Coriolis acceleration. In a dual-mass gyroscope, the Coriolis acceleration has the same magnitude on each proof-mass, but is applied in opposite directions due to the 180-degree phase shift between the two proof-mass motions in the drive mode. Thus, by driving the two masses differentially, a differential Coriolis acceleration is made available for measurement.

One advantage of the suspension system described below is suppression of responses due to translational accelerations applied to the gyroscope. By connecting both proof-masses to at least one stiff, pivoting beam 51, shown in FIG. 3, the two proof-masses are constrained to move in opposite directions along the sense-axis. This constraint suppresses unwanted responses to translational accelerations applied along the sense-axis but does not affect desired responses to Coriolis accelerations.

Figure 4:
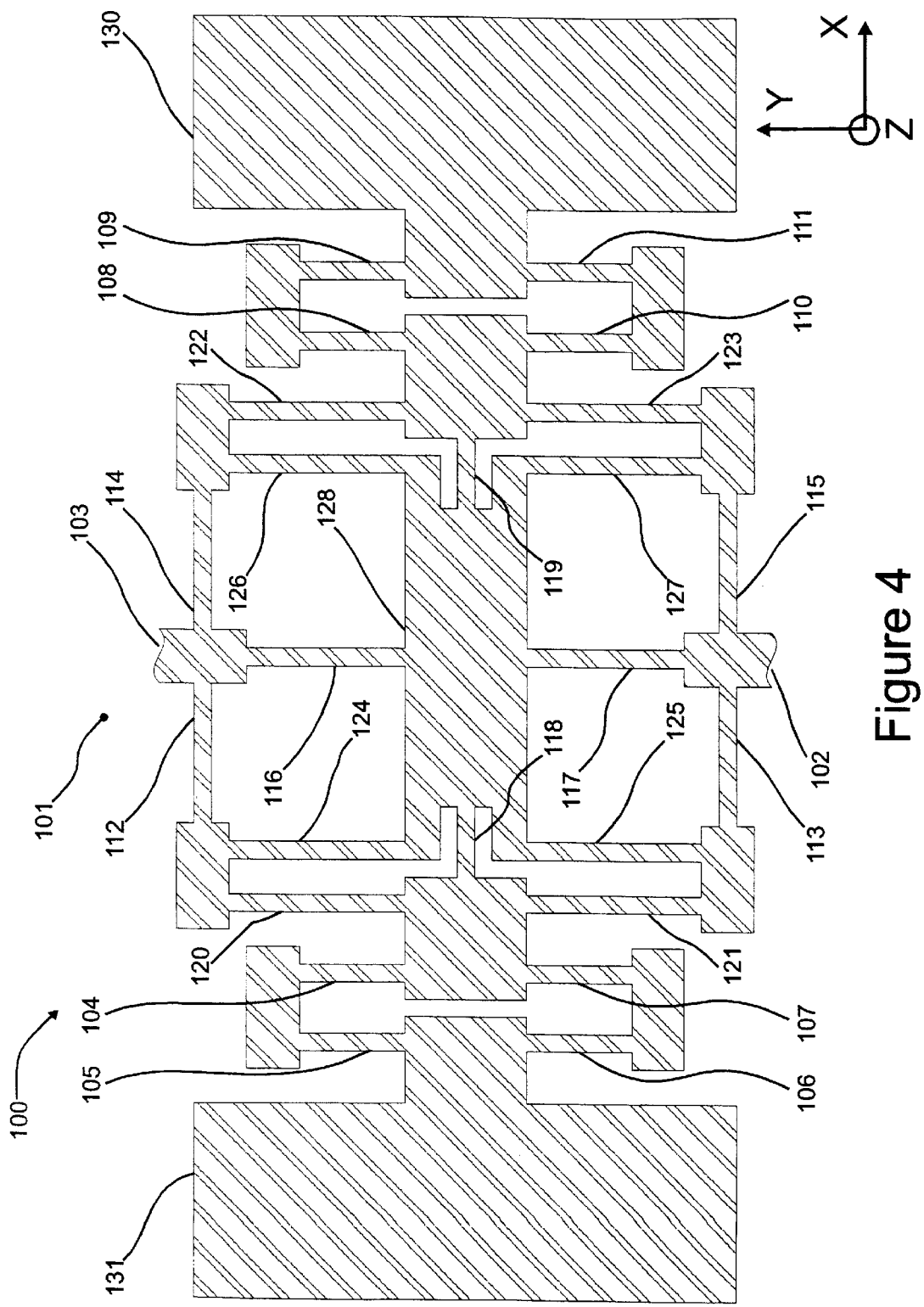
FIG. 4 is a plan view of a dual-mass gyroscopic mechanical sense-element embodiment that suppresses deflections due to translational accelerations along the sense-axis.

FIG. 4 illustrates a first embodiment of a mechanical sense-element 100 for a dual-mass vibratory rate gyroscope in accordance with the invention. The sense-element 100 generates Coriolis acceleration through the interaction of the rotation rate to be measured and the vibrating proof-masses 130 and 131. A suspension system, which includes the set of beams 104 through 127 and lever 128, attaches the proof-masses 130 and 131 to the substrate 101 at two points 102 and 103 defined as anchors. Typically, most beams in the suspension system are longer than they are wide with aspect ratios exceeding a 10 to 1 length to width ratio. This results in beams that are compliant to bending but relatively stiff to compression and extension. Note that beams may be chosen to have different widths or lengths to obtain the desired bending and axial compliance characteristics described below. In addition, each beam may be formed as a single structure as drawn, or a composite structure made from a combination of substantially parallel beams. When the sense-element is formed in a substantially planar material, such as a silicon wafer or layer of polysilicon on a dielectric or on a silicon wafer, flexure dimensions are defined in the following manner: flexure thickness is defined as the thickness of the substantially planar surface into which the microstructure is formed, flexure width is defined as the smallest characteristic dimension perpendicular to the flexure thickness, and flexure length is defined as a remaining characteristic dimension perpendicular to both the flexure thickness and flexure width.

Figure 5:
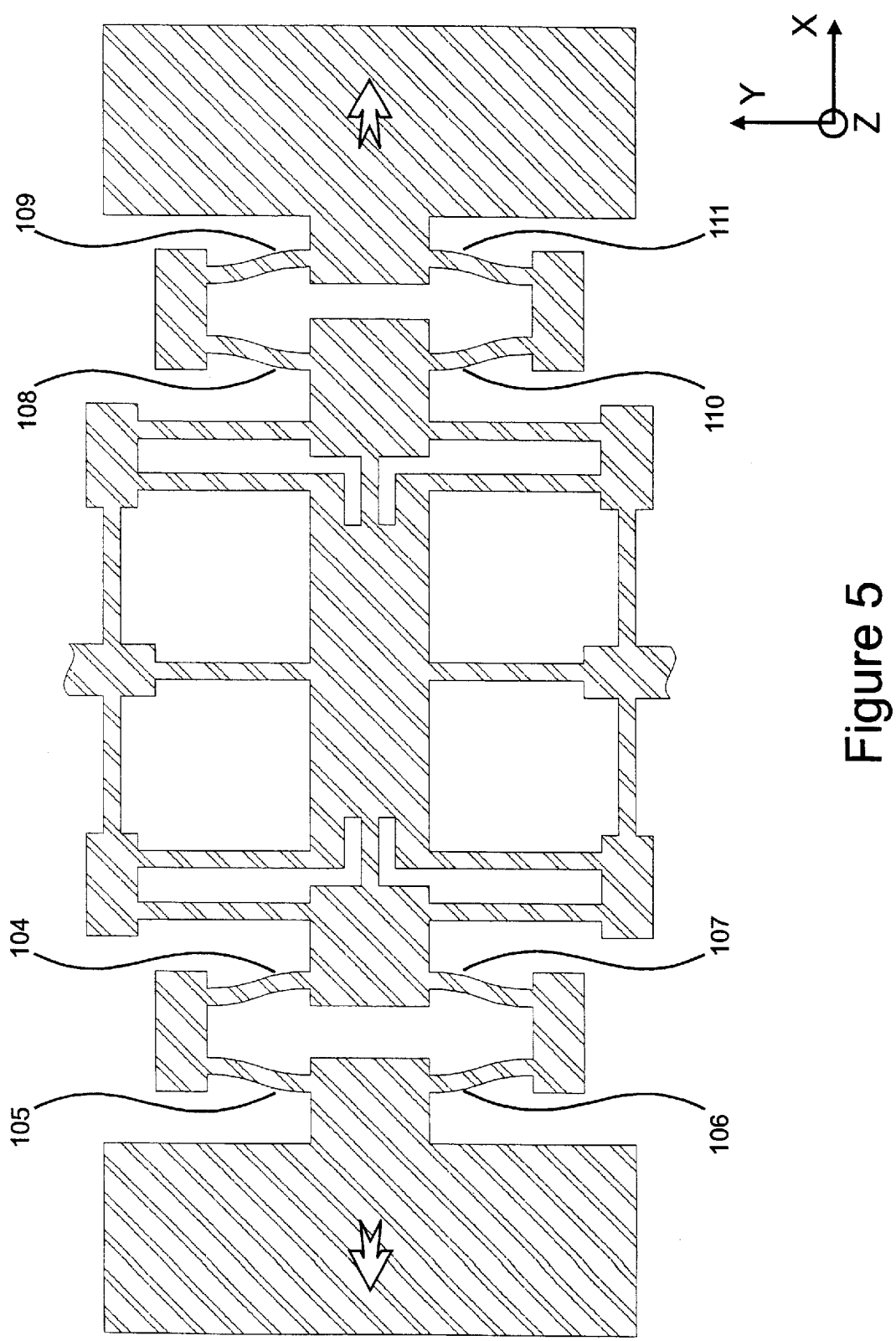
FIG. 5 is a plan view of the sense-element in FIG. 4 showing important deflections of the driven-mode.

The suspended proof-masses 130 and 131 are made to oscillate in an anti-phase motion, the driven mode, which is illustrated in FIG. 5. Driven-mode oscillations result in substantial deflections of beams 104 through 111, while the remaining beams stay largely straight. Since beams 104 through 111 are principally involved in the driven-mode deflections, the compliance of the driven mode is largely determined by these beams.

Figure 6:
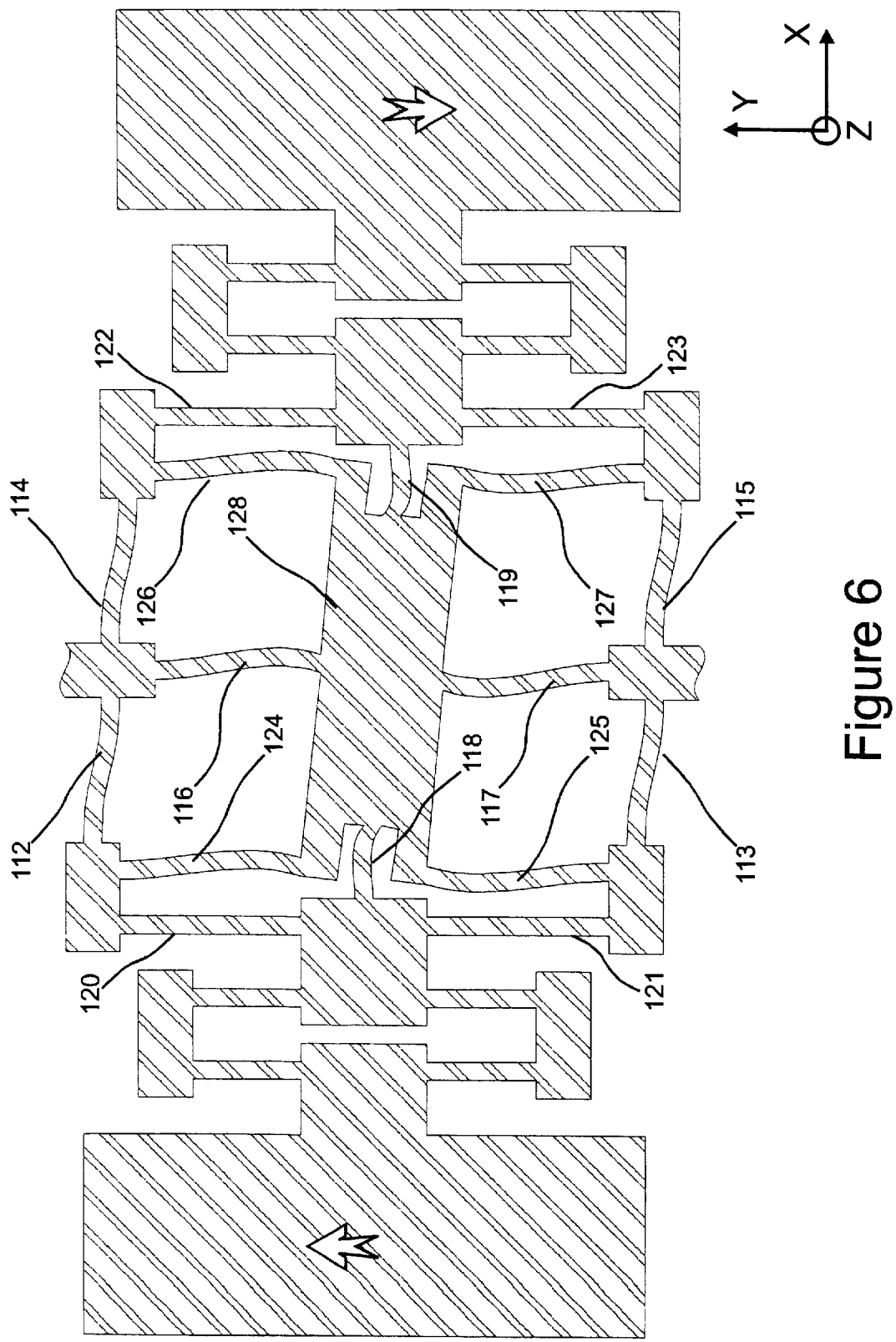
FIG. 6 is a plan view of the sense-element of FIG. 4 showing important sense-mode deflections in response to a Coriolis acceleration.
Figure 7:
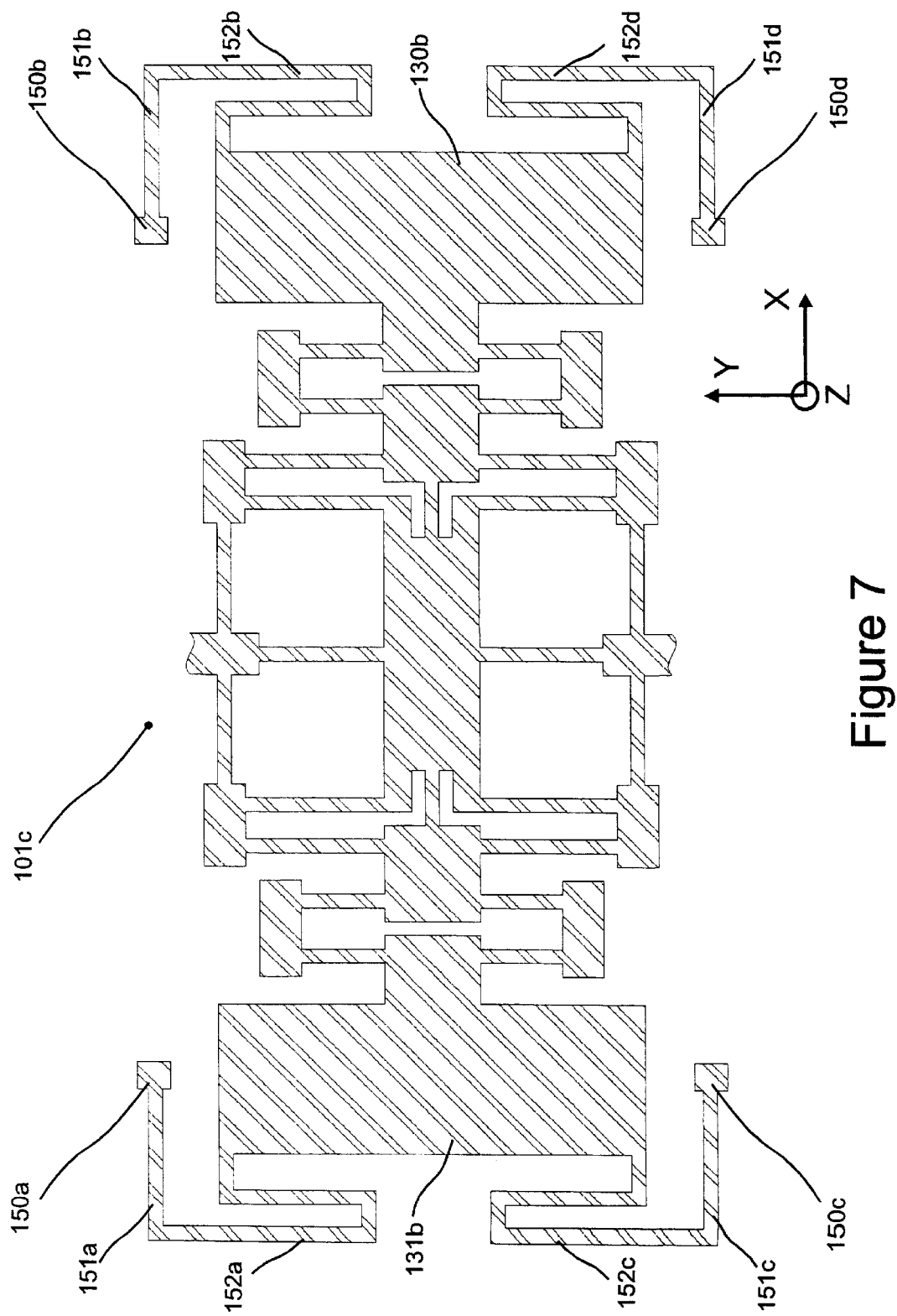
FIG. 7 is a plan view of a second embodiment of the invention that has a modified suspension system and yet has the same major elements.

Once the proof-masses 130 and 131 are driven into oscillation, the structure responds to substrate rotation rate by oscillating in an anti-phase motion, the sense-mode, as illustrated in FIG. 6. The compliance of the deflection shown in FIG. 6 is largely determined by the set of beams 112 through 115 that deflect along the Y-axis. The remaining beams 116 through 119 and 124 through 127 contribute to the compliance of the sense-mode but are typically not dominant contributors. The two proof-masses are forced to move in opposite directions along the Y-axis by the rotating lever 128 and the beams 116 through 127 that connect the lever and the proof-masses. The axial stiffness of beams 116 through 127, coupled with the rotational compliance of beams 116 through 119, enable rotation, but not translation, of the lever 128. Thus, motions of the proof-masses 130 and 131 are constrained to track the ends of the lever 128. Note that the lever realized by this configuration rejects common-mode displacement, where common-mode displacement is defined as displacement of the lever ends in the same direction. Since the lever 128 effectively constrains common-mode displacement, the effect of translational accelerations on proof-mass displacement along the sense-axis is suppressed. To raise the resonant-frequency of parasitic vibrational modes, additional flexures such as 151a–d, 152a–d may be attached between the outside of the proof-masses 130b, 131b and the substrate 101c, anchored by anchors 150a–c as illustrated in a second embodiment shown in FIG. 7.

Figure 8:
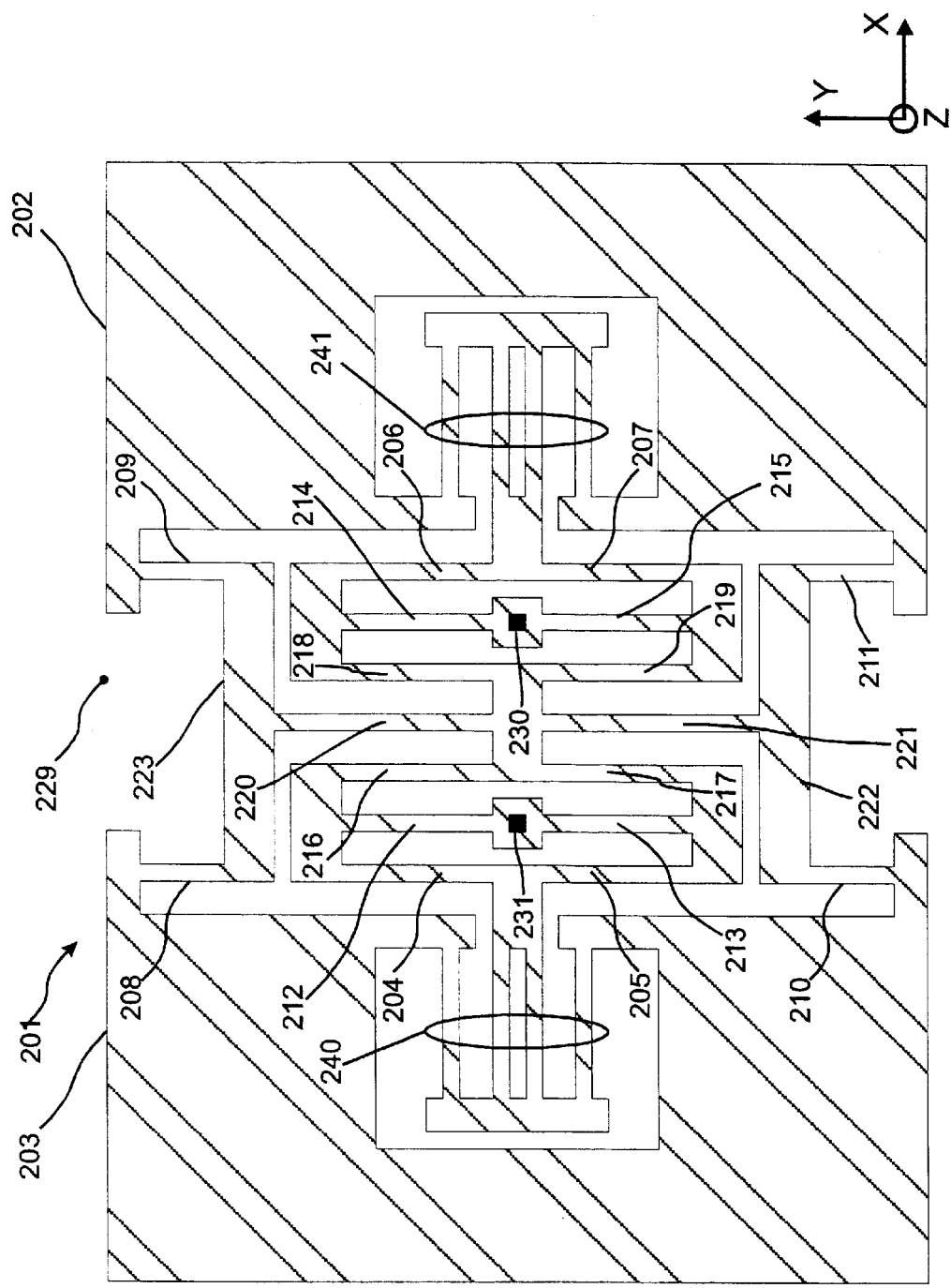
FIG. 8 is a plan view of a third embodiment of the invention that has a modified suspension system and yet has the same major elements.

FIG. 8 illustrates a third embodiment 201 of a dual-mass vibratory rate gyroscope of the type shown in FIG. 3. Although the device in FIG. 8 has a different suspension than the first two embodiments, the behaviors and underlying principles of the three suspensions are similar. In FIG. 8, the two proof-masses 202 and 203 are attached to the substrate 229 by anchors 230 and 231 and the suspension system including: beams 204 through 221, levers 222 and 223, and beams 240 and 241. Beams 204 through 219 deflect along the X-axis and largely determine the driven-mode compliance for the gyroscope. Beams 240 and 241 largely determine the compliance of the sense-mode. Levers 222 and 223 force the two proof-masses 202 and 203 to move in opposite directions along the Y-axis, pivoting about the beams 220 and 221. Beams 204 through 221 are axially stiff, yet rotationally compliant and thus transmit common-mode Y-axis forces and accelerations between the proof-masses 202 and 203, through the levers 222 and 223, to the anchors 230 and 231.

Figure 9:
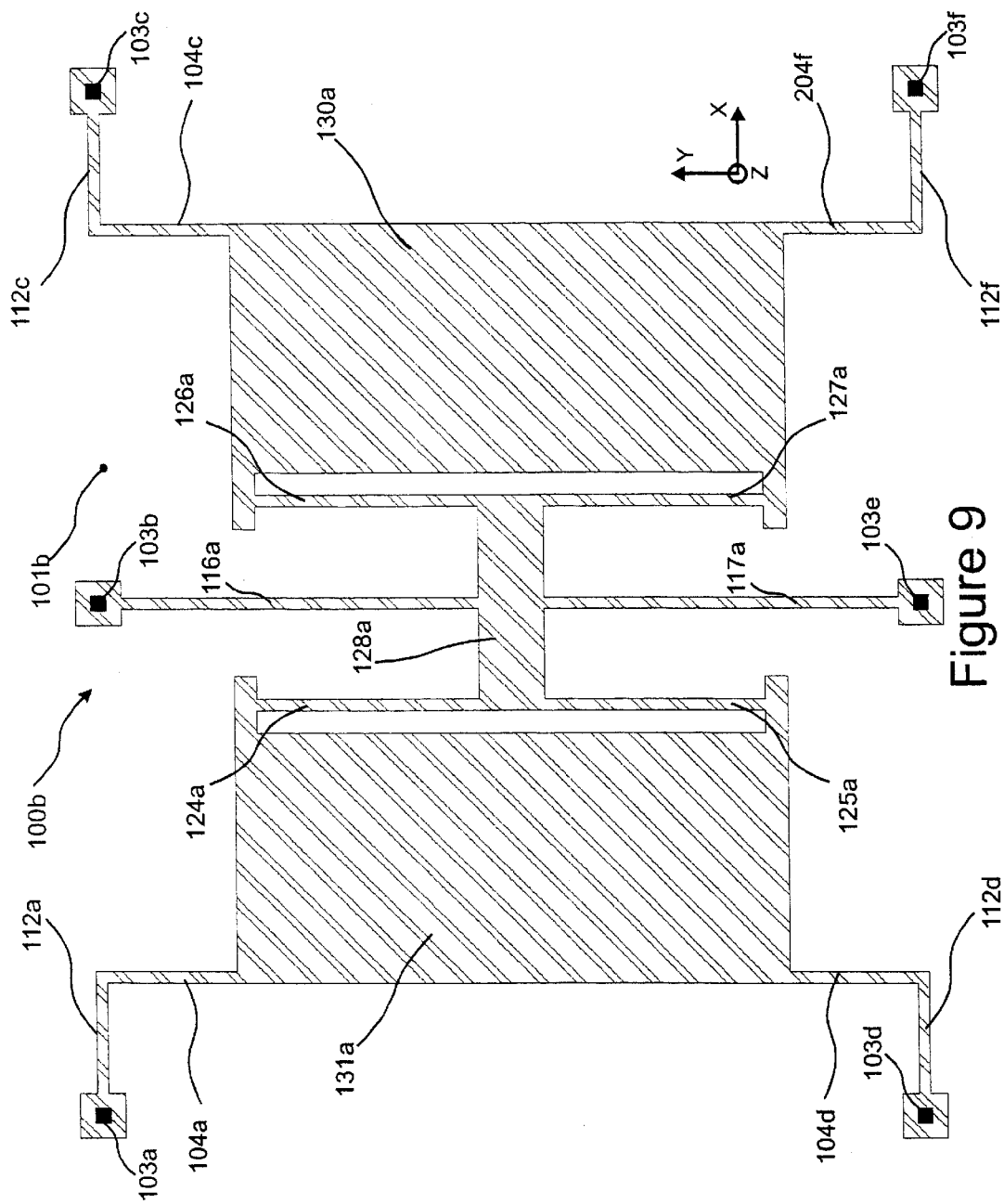
FIG. 9 is a plan view of a fourth embodiment of the invention that has a modified suspension system and yet has the same major elements.

FIG. 9 illustrates a fourth embodiment 100b of a dual-mass vibratory rate gyroscope of the type shown in FIG. 3.

Although the embodiment shown in FIG. 9 has a different suspension than the first three embodiments, the behaviors and underlying principles of the four suspensions are similar. Like the first embodiment, a single lever 128a is used in conjunction with axially stiff and rotationally compliant beams 116a and 117a to enable rotation of the lever while suppressing Y-axis translation of the lever ends. The effect of the lever is to constrain the proof-masses 130a and 131a to move in a differential fashion along the Y-axis. In this embodiment, crab-leg suspensions (formed from beams 112a,c,d,f and 104a,c,d,f) connect the proof-masses to the substrate. Compliance of the crab-leg suspension beams and compliance of beams 124a, 125a, 126a, 127a primarily determine compliance of the sense-mode. Drive-mode compliance is primarily set by the compliance of the crab-leg beams in conjunction with the compliance of beams 124a, 125a, 126a, 127a.

Figure 10:
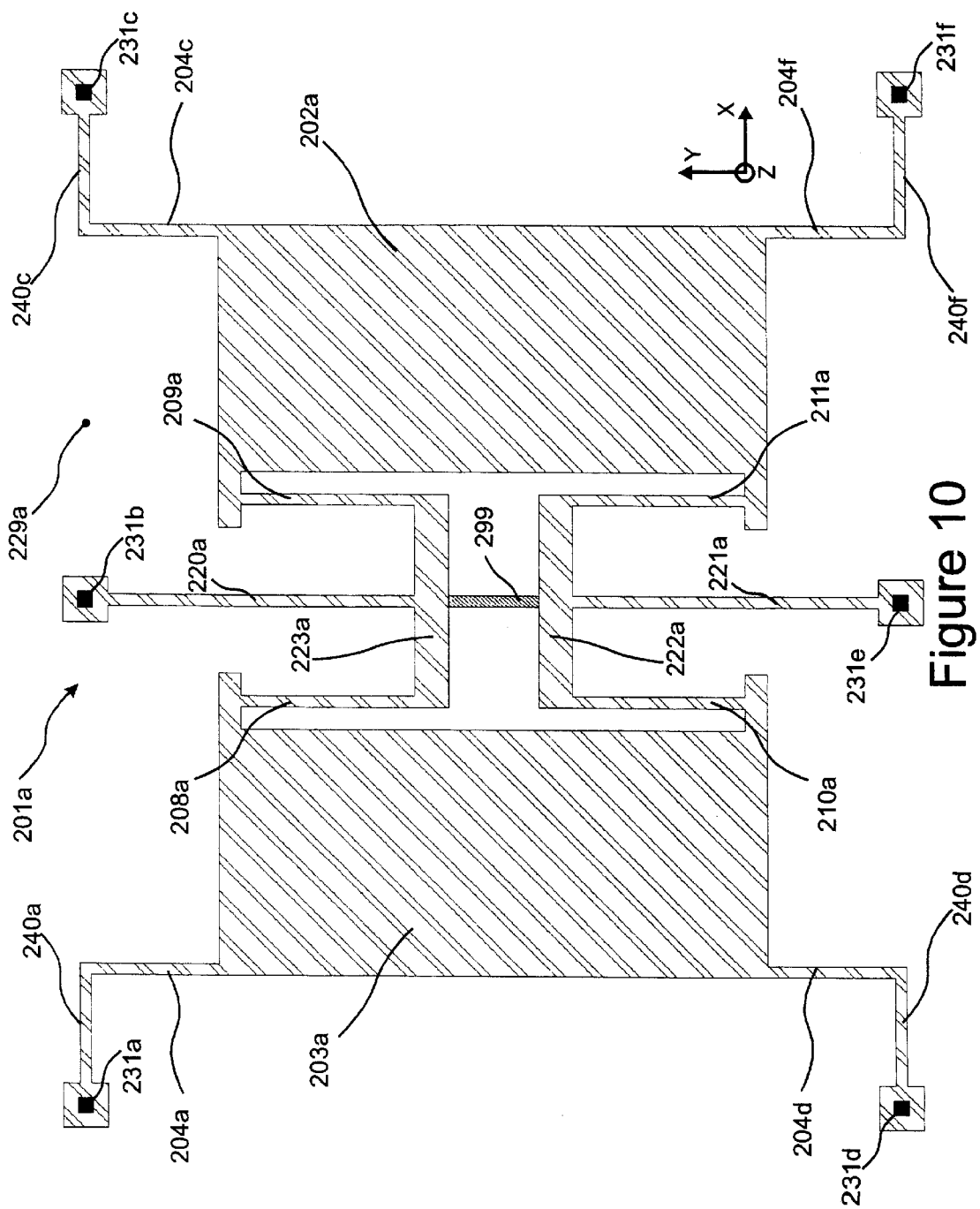
FIG. 10 is a plan view of a fifth embodiment of the invention that has a modified suspension system and yet has the same major elements.

FIG. 10 illustrates a fifth embodiment 201a of a dual-mass vibratory rate gyroscope of the type shown in FIG. 3. Although the embodiment shown in FIG. 10 has a different suspension than the first four embodiments, the behaviors and underlying principles of all five suspensions are similar. Like the third embodiment, two levers 222a and 223a are used in conjunction with axially stiff and rotationally compliant beams 220a and 221a to enable rotation of the levers while suppressing Y-axis translation of the lever ends. Optional beam 299 decreases compliance along the drive-axis for in-phase proof-mass motion, attenuating displacements due to X-axis translational accelerations. The effect of the levers is to constrain the proof-masses 202a and 203a to move in a differential fashion along the Y-axis. In this embodiment, crab-leg suspensions (formed from beams 204a,c,d,f and 240a,c,d,f) connect the proof-masses to the substrate. Compliance of the crab-leg suspension beams and compliance of beams 208a, 209a, 210a, 211a primarily determine compliance of the sense-mode. Drive-mode compliance is primarily set by the compliance of the crab-leg beams in conjunction with the compliance of beams 208a, 209a, 210a, 211a.

In summary, there are several important elements that are common between FIG. 3, FIG. 4, FIG. 7, FIG. 8, FIG. 9, and FIG. 10. The use of two proof-masses 52 and 53, 130 and 131 or 202 and 203. These proof-masses are mounted in a suspension that has two principal compliant modes. The drive-mode is such that the two proof-masses oscillate differentially (in an anti-phase manner), largely parallel to the drive-or X-axis. The sense-mode is such that the two proof-masses are constrained to move in opposite directions largely parallel to the Y-axis. The sense-mode is constrained with a lever mechanism 51, 128, or 222 and 223 that is attached to the substrate 101 or 229 via anchors 102 and 103 or 230 and 231 using axially stiff yet rotationally compliant beams. Thus the suspension allows the two proof-masses to be driven to oscillate differentially and respond differentially to Coriolis acceleration, while other mechanical responses in the sense-axis are suppressed.

Figure 11:
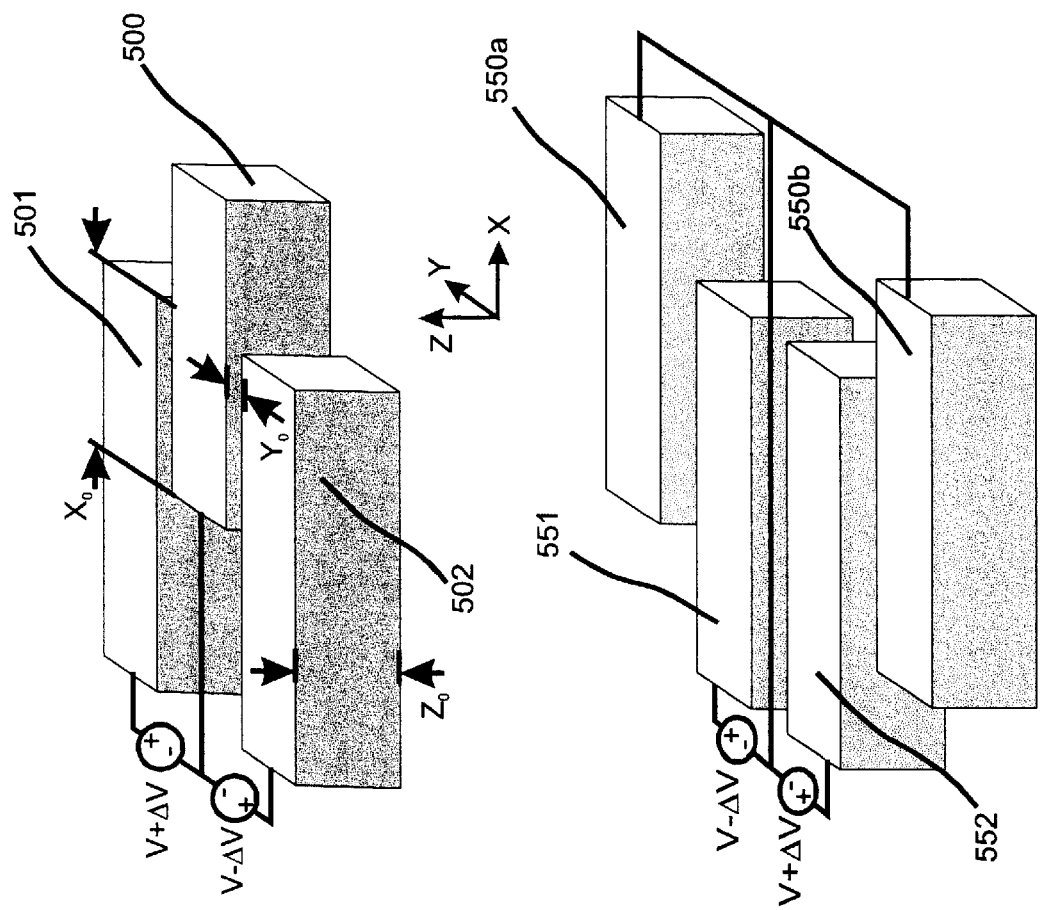
FIG. 11 is a perspective view of two embodiments of a set of comb-fingers suitable for quadrature-error cancellation.

In a further aspect of the invention, a differential quadrature-nulling structure may be included with the first through fifth embodiments of the invention. FIG. 11 shows a schematic diagram of two different differential comb-finger structures suitable for reducing quadrature error arising from drive-mode motion coupling into the sense-axis. Comb finger 500 (550a,b) is attached to a proof-mass, while stationary comb-fingers 501 (551) and 502 (552) are attached to the substrate. Two voltages with respect to the proof-mass are applied to the stationary comb fingers. The voltages may be resolved into common-mode and differential voltage components V and ΔV respectively. As comb-finger 500 moves along the negative X-axis, the overlap area of the capacitive plates increases. The change in the overlap area (a linear function of X-axis position) causes a corresponding change in the magnitude of the total force along the Y-axis proportional to X-axis position. This force is represented by the term on the right of the following equation:

$$F_Y(x) = \frac{2\varepsilon_0 Z_0(X_0 - x)}{Y_0^2} V \Delta V \quad \text{Equation 5}$$

$$= \underbrace{\left(\frac{2\varepsilon_0 Z_0 X_0}{Y_0^2} V \Delta V\right)}_{\text{Static Force}} - \underbrace{\left(\frac{2\varepsilon_0 Z_0}{Y_0^2} V \Delta V\right) x}_{\substack{\text{Force Dependent on} \\ \text{X-axis Displacement}}}$$

In Equation 5, $X_0$ and $Z_0$ are the nominal overlap of the quadrature-nulling structure, $Y_0$ is the nominal separation distance between the movable comb-finger 500 and the stationary comb-fingers, $\varepsilon_0$ is the permittivity of free space, and x is the displacement of the end of comb-finger 500 from the nominal position.

Figure 12:
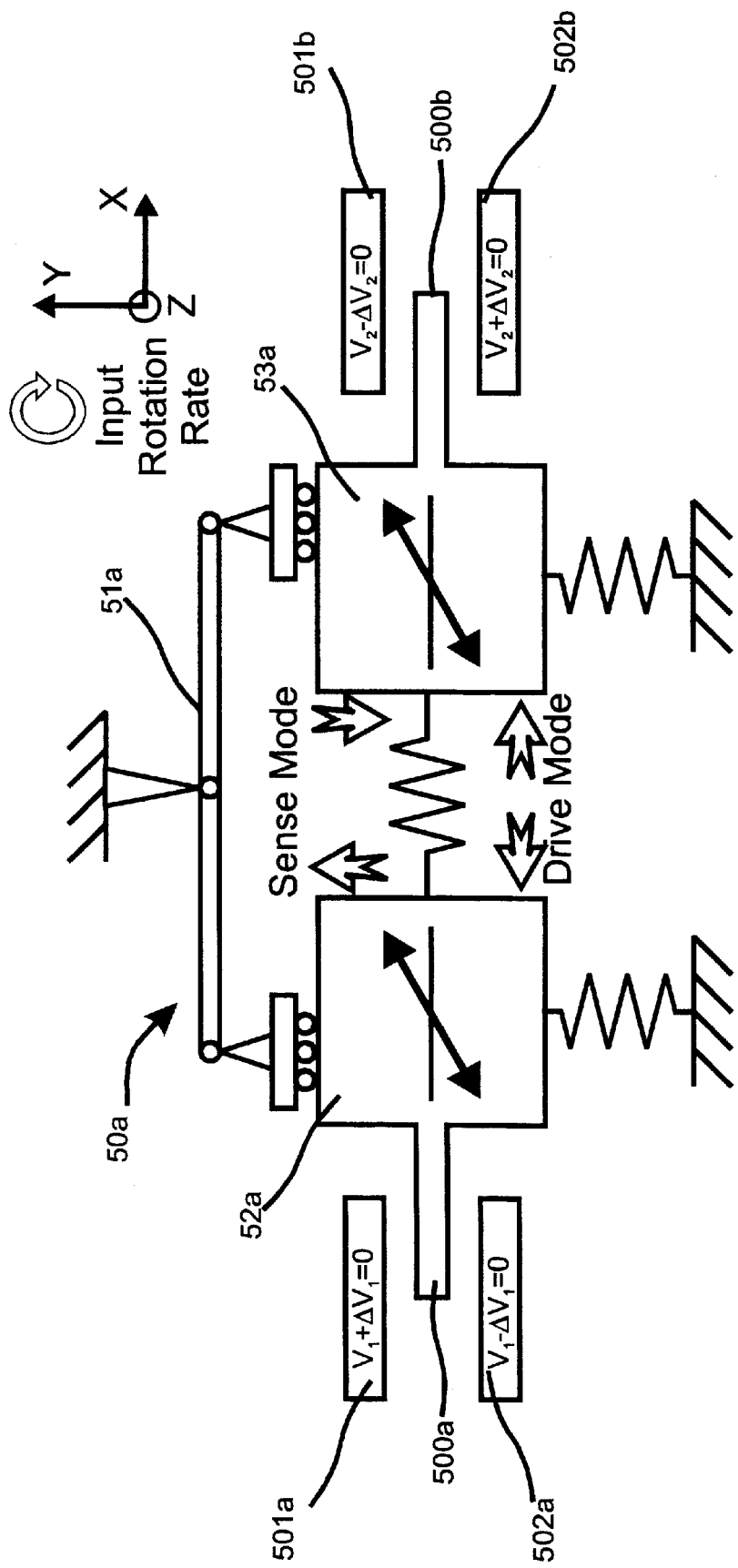
FIG. 12 is a conceptual representation of proof-mass motions due to quadrature error in a gyroscopic dual-mass mechanical sense-element.
Figure 13:
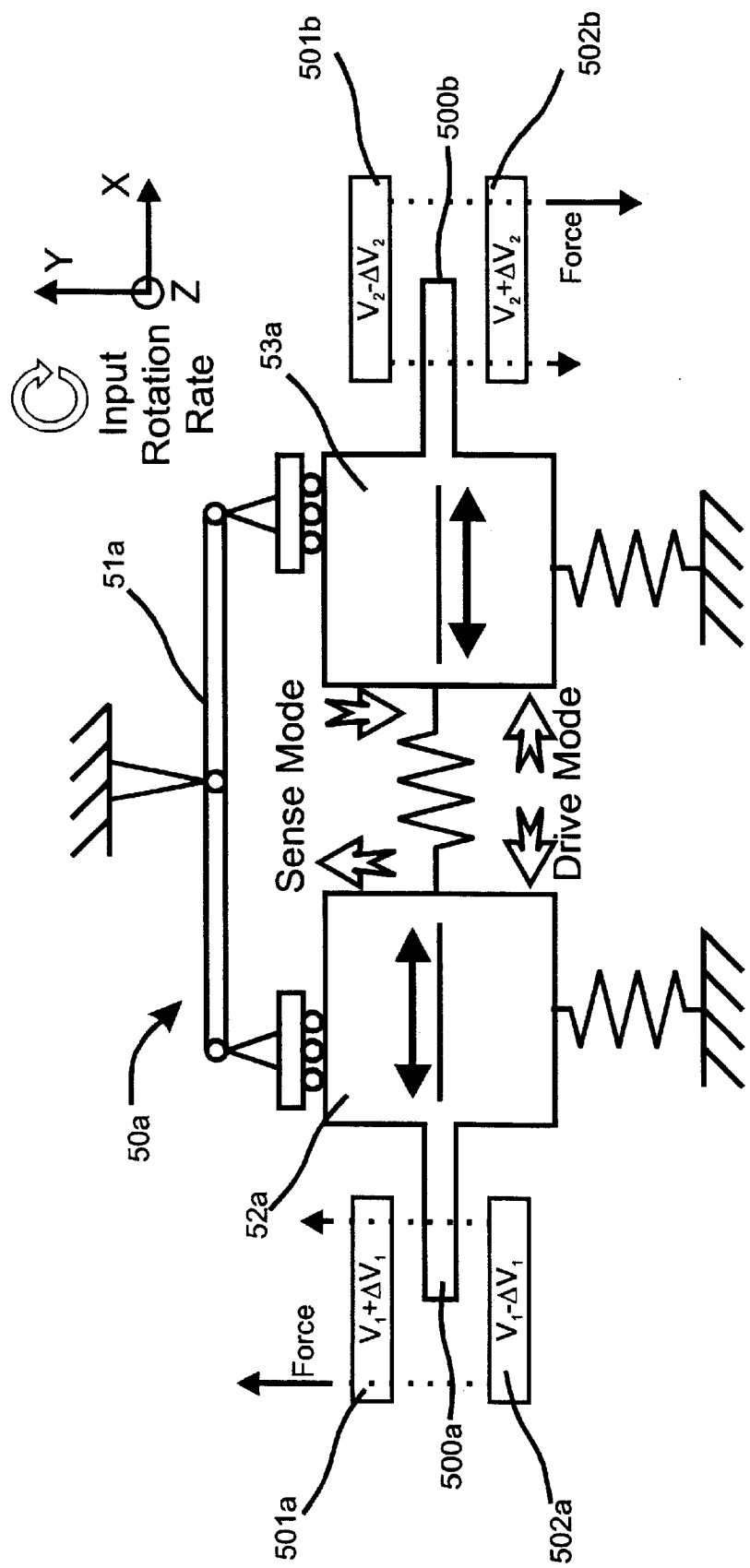
FIG. 13 is a conceptual representation of proof-mass motions with suppressed quadrature error when quadrature-error cancellation is activated.

FIG. 12 is a simplified schematic of a two-mass gyroscope with a differential quadrature-error cancellation structure comprised of comb-fingers 500ab, 501ab, and 502ab. Comb-finger structures 500a and 500b are attached to each proof-mass 52a and 53a to enable cancellation of differential quadrature error. Nominal motion of the proof-masses with quadrature-error, with quadrature-error cancellation disabled (all bias voltages set to zero), and with zero rate input is shown in FIG. 12. When active, quadrature-error cancellation, shown in FIG. 13, applies voltages that result in cancellation of the undesired differential motion. The displacement-dependent forces generated by these bias voltages rotate the drive-mode such that it becomes perpendicular to the sense-axis. A by product of the quadrature-error cancellation structure shown in FIG. 12 and FIG. 13 is the introduction of a static differential displacement in the sense-mode. This static displacement is of little consequence, however, since Coriolis acceleration occurs as sense mode motion near the drive-mode frequency. In FIG. 13, voltages $V_1$ and $V_2$ may have different values or voltages $\Delta V_1$ and $\Delta V_2$ may have different values. Alternatively, voltages $V_1$ and $V_2$ may have the same value or voltages $\Delta V_1$ and $\Delta V_2$ may have the same value. All voltages may be either positive or negative depending on the sign of the quadrature-error. The common-mode voltages $V_1$ and $V_2$ are given with respect to the potential of the comb-fingers 500a and 500b respectively.

By adjusting common-mode or differential bias voltages, the magnitude and sign of the quadrature-nulling force may be varied. Since quadrature-error is in-phase or 180 degrees out-of-phase with drive-mode displacement, voltages may be chosen to generate forces to null the quadrature error. Bias voltages may be generated open loop. Alternatively, these voltages may be adjusted using feedback of measured quadrature error to drive quadrature-error towards zero.

Figure 14:
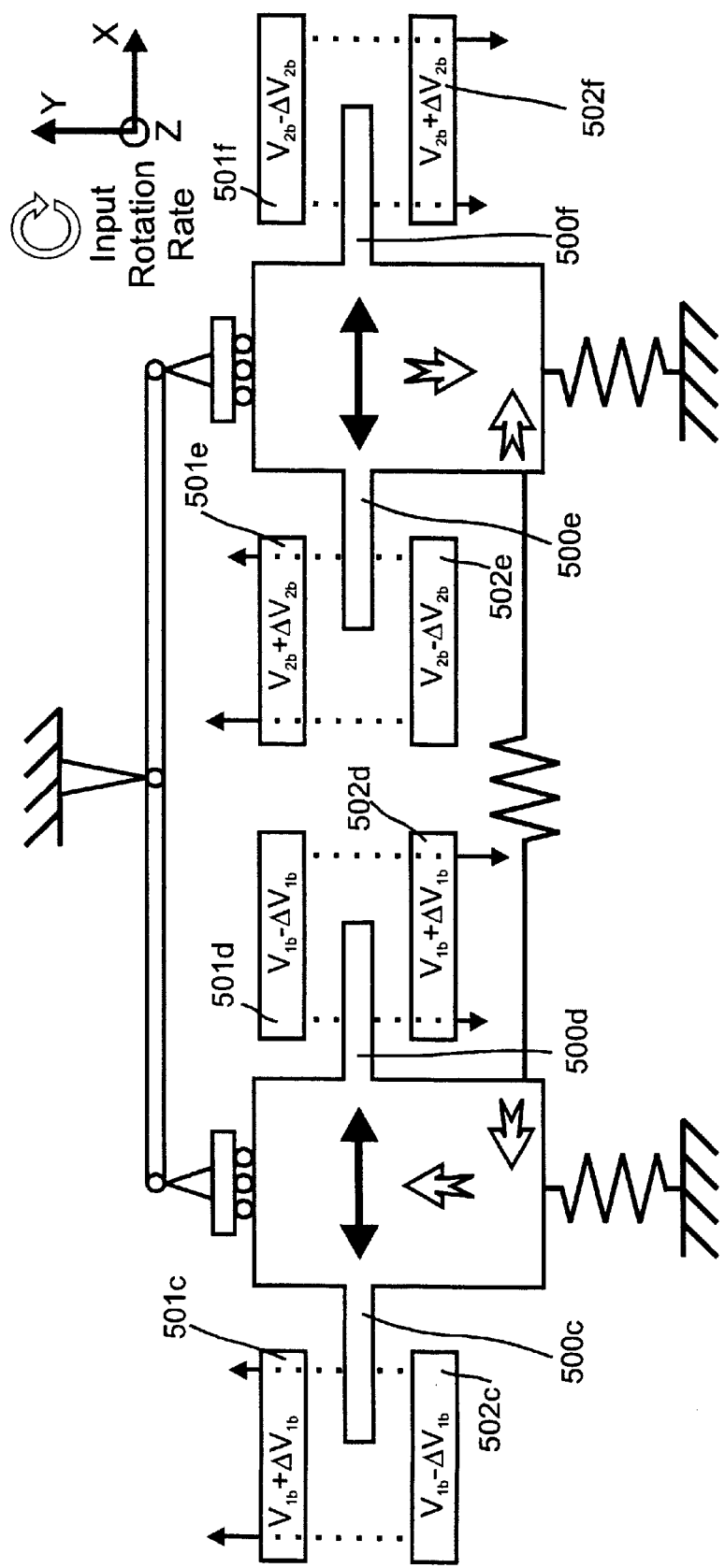
FIG. 14 is a conceptual representation of proof-mass motions with suppressed quadrature error when balanced quadrature-error cancellation is activated.

In yet another aspect of the invention, a balanced quadrature-nulling structure comprised of comb fingers 500cdef, 501cdef, and 502cdef may be included with the first through fifth embodiments of the invention as schematically shown in FIG. 14. The static displacement shown in FIG. 13 is greatly attenuated through the use of balanced bias forces on each proof-mass.

Primary mechanical-design factors affecting the noise floor of a vibratory rate gyroscope include the size of the sensor, the driven- and sense-mode resonant frequencies of the structure, and the damping of the resonant modes. In order to minimize noise, it is desirable to make the mechanical sense-element as large as possible limited by the fabrication technology and undesirable vibration modes that can occur with large structures. In addition, operation of the device in a vacuum reduces the air damping of the structure, which also reduces noise. The substantially planar nature of the sense-element lends itself well to single-crystal silicon technologies. In these technologies, the structures are typically 10 $\mu$m to 500 $\mu$m thick and occupy an area from 1 mm$^2$ to 100 mm$^2$. For improved performance, the sensors may operate in a partial vacuum on the order of 100 mTorr.

The invention has been described as being advantageous because it may exploit the benefits of single crystal-silicon fabrication technology. However, the embodiments described here may also be fabricated using other technologies and materials including, but not limited to: surface-micromachining, epi-polysilicon, bulk micromachining, plated metal, and quartz.

The foregoing description, for the purposes of explanation, used specific nomenclature to provide a thorough understanding of the invention. However, it will be apparent to one skilled in the art that the specific details are not required in order to practice the invention. Thus, the foregoing descriptions of specific embodiments of the invention are presented for the purposes of illustration and description. They are not intended to be exhaustive or to limit the invention to the precise forms disclosed, obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A microsensor for measuring angular motion comprising:
   a substrate having a first surface;
   a first movable mass connected to said substrate;
   a second movable mass connected to said substrate;
   an input axis normal to said first surface of said substrate; and
   a suspension comprising a coupling extending from said first movable mass to said second movable mass, said suspension allowing anti-phase movement by said first and second movable masses along a first axis parallel to said first surface of said substrate while allowing anti-phase movement and resisting in-phase movement by said movable masses along a second axis parallel to said first surface of said substrate, said second axis being substantially orthogonal to said first axis.

2. The microsensor of claim 1 wherein said coupling includes at least one lever, said lever allowing anti-phase movement and resisting in-phase movement of said first and second masses along said second axis.

3. The microsensor of claim 2 wherein said coupling further includes two or more flexures allowing anti-phase movement along said first axis.

4. The microsensor of claim 1 wherein said suspension includes two or more flexures allowing anti-phase movement along said second axis, while providing a restoring force that generally tends to restore said first and second masses to a nominal position in the absence of external forces.

5. The microsensor of claim 1 further including a force transducer for exciting anti-phase motion of the first and second masses along said first axis.

6. The microsensor of claim 5 further including a detection device for detecting anti-phase motion of the first and second masses along said first axis.

7. The microsensor of claim 5 wherein the force transducer includes:
   a first substantially stationary conductive comb anchored to said substrate having a first plurality of fingers extending towards the first mass;
   a second conductive comb connected to the first mass having a second plurality of fingers that interdigitate with the first plurality of fingers, the first and second combs forming electrodes of a first capacitor;
   a third substantially stationary conductive comb anchored to said substrate having a third plurality of fingers extending towards the second mass;
   a fourth conductive comb connected to the second mass having a fourth plurality of fingers that interdigitate with the third plurality of fingers, the third and fourth combs forming electrodes of a second capacitor; and
   an electrical connection between the first through fourth combs such that a voltage applied to said electrical connection provides anti-phase forces to the first and second masses along said first axis.

8. The microsensor of claim 6 wherein the detection device includes
   a first substantially stationary conductive comb anchored to said substrate having a first plurality of fingers extending towards the first mass;
   a second conductive comb connected to the first mass having a second plurality of fingers that interdigitate with the first plurality of fingers, the first and second combs forming electrodes of a first capacitor;
   a third substantially stationary conductive comb anchored to said substrate having a third plurality of fingers extending towards the second mass;
   a fourth conductive comb connected to the second mass having a fourth plurality of fingers that interdigitate with the third plurality of fingers, the third and fourth combs forming electrodes of a second capacitor; and
   an electrical connection between the first through fourth combs, said electrical connection having an output, said output providing a differential capacitance representative of anti-phase motion of the first and second masses along said first axis.

9. The microsensor of claim 7 further including a detection device for detecting anti-phase motion of the first and second masses along said first axis.

10. The microsensor of claim 9 wherein the detection device comprises:
    said first capacitor;
    said second capacitor;
    said electrical connection; and
    further includes circuitry for frequency-multiplexing voltages applied to said connection for force transducing and motion detection.

11. The microsensor of claim 9 wherein the detection device comprises:
    said first capacitor;
    said second capacitor;
    said electrical connection; and
    further includes circuitry for time-multiplexing voltages applied to said connection for force transducing and motion detection.

12. The microsensor of claim 1 further including a detection device for detecting anti-phase motion of the first and second masses along said second axis.

13. The microsensor of claim 12 wherein said detection device includes:
   a first set of one or more generally parallel substantially stationary first finger pairs anchored to said substrate extending towards the first mass, the first mass having at least two fingers interdigitated by a first anchored finger pair forming a first capacitor half-bridge;
   a second set of one or more generally parallel substantially stationary second finger pairs anchored to said substrate extending towards the second mass, the second mass having at least two fingers interdigitated by a second anchored finger pair forming a second capacitor half-bridge; and
   an electrical connection between the first and second capacitor half-bridges, said electrical connection having an output, said output providing a differential capacitance representative of anti-phase motion of the first and second masses along said second axis.

14. The microsensor of claim 1 further including:
   a) a quadrature-cancellation structure comprising:
      a1) a first set of one or more generally parallel substantially stationary first finger pairs anchored to said substrate extending towards the first mass, the first mass having at least two fingers interdigitated by a first anchored finger pair, the end of each first anchored finger pair terminating between fingers attached to the first mass, forming a first capacitor half-bridge;
      a2) a second set of one or more generally parallel substantially stationary second finger pairs anchored to said substrate extending towards the second mass, the second mass having at least two fingers interdigitated by a second anchored finger pair, the end of each second anchored finger pair terminating between fingers attached to the second mass, forming a second capacitor half-bridge; and
   b) an electrical circuit providing a first differential voltage with a common-mode component across the first half bridge, and a second differential voltage with a second common-mode component across the second half bridge thereby providing a position-dependent force to cause the first and second masses to vibrate absent a Coriolis force, more precisely along the direction of extension of said first axis.

15. The microsensor of claim 1 further including:
   a) a quadrature-cancellation structure comprising:
      a1) a first set of one or more generally parallel substantially stationary first finger pairs anchored to said substrate extending towards the first mass, the first mass having at least one finger interdigitated between at least one first anchored finger pair, the end of each finger extending from the first mass terminating between a first anchored finger pair, forming a first capacitor half-bridge;
      a2) a second set of one or more generally parallel substantially stationary second finger pairs anchored to said substrate extending towards the second mass, the second mass having at least one finger interdigitated between at least one second anchored finger pair, the end of each finger extending from the second mass terminating between a second anchored finger pair, forming a second capacitor half-bridge; and
   b) an electrical circuit providing a first differential voltage with a common-mode component across the first half bridge, and a second differential voltage with a second common-mode component across the second half bridge thereby providing a position-dependent force to cause the first and second masses to vibrate absent a Coriolis force, more Precisely along the direction of extension of said first axis.

16. The microsensor of claim 1 wherein said microsensor is formed by etching directly into a silicon or bonded silicon wafer.

17. The microsensor of claim 16 wherein the coupling includes one or more flexures having:
   a flexure thickness at least 5 times flexure width; and
   a flexure length at least 10 times flexure width.

18. The microsensor of claim 1 wherein said microstructure is formed by deposition and subsequent etching of a conductive material onto a silicon wafer, portions of the silicon wafer being potentially covered by a dielectric layer.

19. The microsensor of claim 18 wherein the coupling includes one or more flexures having:
   a flexure thickness at least 2 times flexure width; and
   a flexure length at least 5 times flexure width.

20. The microsensor of claim 1 wherein the coupling includes one or more composite flexures formed of two or more substantially parallel flexures attached at two or more points.

21. A vibratory gyroscope comprising:
   a) a substrate having a first surface;
   b) a first movable mass connected to said substrate;
   c) a second movable mass connected to said substrate;
   d) a coupling extending from said first movable mass to said second movable mass, said coupling allowing anti-phase movement by said first movable mass and said second movable mass along a first axis while allowing anti-phase movement along a second axis substantially orthogonal to said first axis, said first and second axes being generally parallel to said first surface of the substrate;
   e) a quadrature-cancellation structure including:
      e1) a first set of one or more generally parallel substantially stationary first finger pairs anchored to said substrate extending towards said first movable mass, said first movable mass having at least two fingers interdigitated by a first anchored finger pair, the end of each first anchored finger pair terminating between fingers attached to said first movable mass, forming a first capacitor half-bridge;
      e2) a second set of one or more generally parallel substantially stationary second finger pairs anchored to said substrate extending towards said second movable mass, said second movable mass having at least two fingers interdigitated by a second anchored finger pair, the end of each second anchored finger pair terminating between fingers attached to said second movable mass, forming a second capacitor half-bridge; and
   f) electrical circuitry for generation and application of a differential voltage with a common-mode component across said first half bridge, and a potentially different differential voltage with potentially different common-mode component across said second half bridge resulting in a position-dependent force that may be used to cancel quadrature-error.

22. A vibratory gyroscope comprising:
   a) a substrate having a first surface;
   b) a first movable mass connected to said substrate;
   c) a second movable mass connected to said substrate;

d) a coupling extending from said first movable mass to said second movable mass, said coupling allowing anti-phase movement by said first movable mass and said second movable mass along a first axis while allowing anti-phase movement along a second axis substantially orthogonal to said first axis, said first and second axes being generally parallel to said first surface of the substrate;

e) a quadrature-cancellation structure including:

e1) a first set of one or more generally parallel substantially stationary first finger pairs anchored to said substrate extending towards said first movable mass, said first movable mass having at least one finger interdigitated between at least one first anchored finger pair, the end of each finger extending from said first movable mass terminating between a first anchored finger pair, forming a first capacitor half-bridge;

e2) a second set of one or more generally parallel substantially stationary second finger pairs anchored to said substrate extending towards said second movable mass, said second movable mass having at least one finger interdigitated between at least one second anchored finger pair, the end of each finger extending from said second movable mass terminating between a second anchored finger pair, forming a second capacitor half-bridge; and f) electrical circuitry for generation and application of a differential voltage with a common-mode component across the first half bridge, and a potentially different differential voltage with potentially different common-mode component across the second half bridge resulting in a position-dependent force that may be used to cancel quadrature-error.

* * * * *